United States Patent
Park et al.

(10) Patent No.: US 7,920,941 B2
(45) Date of Patent: Apr. 5, 2011

(54) DUST DETECTION METHOD AND APPARATUS FOR CLEANING ROBOT

(75) Inventors: Jun-ho Park, Hwaseong-si (KR); Dong-ryeol Park, Yongin-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 909 days.

(21) Appl. No.: 11/029,631

(22) Filed: Jan. 6, 2005

(65) Prior Publication Data

US 2005/0192707 A1 Sep. 1, 2005

(30) Foreign Application Priority Data

Feb. 27, 2004 (KR) .................. 10-2004-0013569

(51) Int. Cl.
*G05B 19/04* (2006.01)
*B25J 5/00* (2006.01)

(52) U.S. Cl. .................. 700/259; 700/245; 318/568.12; 318/589; 345/589

(58) Field of Classification Search .................. 700/245, 700/259; 318/568.12, 580; 345/589
See application file for complete search history.

(56) References Cited

U.S. PATENT DOCUMENTS

| | | | |
|---|---|---|---|
| 6,374,155 B1 * | 4/2002 | Wallach et al. ................ | 700/245 |
| 7,170,252 B2 * | 1/2007 | Maeki ............................ | 318/580 |
| 7,288,912 B2 * | 10/2007 | Landry et al. ................. | 318/580 |
| 2003/0030398 A1 * | 2/2003 | Jacobs et al. ............. | 318/568.12 |
| 2004/0088080 A1 * | 5/2004 | Song et al. .................... | 700/259 |
| 2004/0167669 A1 * | 8/2004 | Karlsson et al. ............. | 700/259 |
| 2004/0211444 A1 * | 10/2004 | Taylor et al. .................... | 134/18 |
| 2005/0134599 A1 * | 6/2005 | Nayar et al. .................. | 345/589 |

* cited by examiner

*Primary Examiner* — Khoi Tran
*Assistant Examiner* — Ian Jen
(74) *Attorney, Agent, or Firm* — Staas & Halsey LLP

(57) ABSTRACT

A dust detection method and apparatus of a cleaning robot. The dust detection method involves acquiring a floor image as a current floor image of a predetermined place at a current location of the cleaning robot in the predetermined place; obtaining a difference image between the current floor image and a background image selected from a feature map consisting of a plurality of floor images of the predetermined place; and detecting a dusty area based on the difference image and adjusting a cleaning power of the cleaning robot.

13 Claims, 7 Drawing Sheets

DUST DETECTION METHOD AND APPARATUS FOR CLEANING ROBOT

CROSS-REFERENCE TO RELATED APPLICATION

This application claims the priority of Korean Patent Application No. 2004-13569, filed on Feb. 27, 2004, in the Korean Intellectual Property Office, the disclosure of which is incorporated herein by reference.

BACKGROUND OF THE INVENTION

1. Field of the Invention

The present invention relates to a cleaning robot, and more particularly, to a dust detection method and apparatus which can increase the efficiency of a cleaning process by automatically detecting dust on a floor, appropriately adjusting a cleaning power of a cleaning robot, and appropriately modifying a cleaning path of the cleaning robot.

2. Description of Related Art

Recently, a variety of mobile robots, which generally include a driving means, sensors, and a travel controller and perform many useful functions while autonomously operating, have been developed. For example, a cleaning robot is a cleaning device that collects dust and dirt on the floor while autonomously moving about the surface without a user's control. For a more efficient cleaning process, the cleaning robot is required to correlate its cleaning power to the amount of dust and dirt on the floor.

Various dust detection techniques for a cleaning robot, which adjust the cleaning power of the cleaning robot based on a result of determining the amount of dust and dirt on the floor, are disclosed in U.S. Pat. Nos. 5,163,202, 5,233,682, and 6,023,814. More specifically, in U.S. Pat. No. 5,163,202, a light emitter and a light receptor are installed on a dust suction tube of a cleaning robot, and the amount of dust and dirt on the floor of a room is determined based on the amount of light received by the light receptor. In U.S. Pat. No. 5,233,682, the amount of dust and dirt determined based on the amount of light received by the light receptor, and the sizes of dust and dirt particles are also measured based on a total amount of time required for dust and dirt particles to pass through an optical passage. However, the dust detectability of these two patented techniques may deteriorate after a period of use because there is a high probability of impurities being accumulated at the light receptor and the light emitter. In order to solve this problem, U.S. Pat. No. 6,023,814 discloses a vacuum cleaner which includes a detection sensitivity correction unit installed at a suction passage.

All of the above patented techniques cannot determine whether dust particles exist on the floor until they draw the dust through a suction passage. In addition, the above patented techniques detect dust without considering the state of the floor, and thus, the efficiency of a cleaning process may deteriorate.

SUMMARY OF THE INVENTION

An aspect of the present invention provides a dust detection method and apparatus, which can increase the efficiency of a cleaning process by automatically detecting dust on the floor, adjusting a cleaning power of a cleaning robot, and modifying a cleaning path of the cleaning robot.

According to an aspect of the present invention, there is provided a dust detection method of a cleaning robot. The dust detection method includes acquiring a floor image as a current floor image of a predetermined place at a current location of the cleaning robot in the predetermined place; obtaining a difference image between the current floor image and a background image selected from a feature map consisting of a plurality of floor images of the predetermined place; and detecting a dusty area based on the difference image and adjusting a cleaning power of the cleaning robot.

The feature map may be generated by causing the cleaning robot to remove dust and dirt on the floor of the predetermined place, acquire floor images of the predetermined place, and store, as a map, the acquired floor images and the respective locations of the cleaning robot provided by a localization system.

In the acquiring, an illumination unit of the cleaning robot may be turned on when acquiring the current floor image.

In the acquiring, a portion of the current floor image which needs to be processed may be determined based on the speed of the cleaning robot.

If the plurality of floor images of the feature map have no patterns, one of floor images may be selected as the background image, and otherwise, the obtaining may include performing template matching on the current floor image and each of the plurality of floor images of the feature map; comparing a maximum among similarities obtained as template matching results with a predetermined reference value; and selecting one of the plurality of floor images of the feature map corresponding to the maximum similarity as the background image if the maximum similarity is larger than the predetermined reference value and setting the cleaning power of the cleaning robot to a maximum level if the maximum similarity is not larger than the predetermined reference value.

According to another aspect of the present invention, there is provided a dust detection apparatus of a cleaning robot. The dust detection apparatus includes an image acquisition unit which acquires a floor image as a current floor image of a predetermined place at a current location of the cleaning robot in the predetermined place; and a control unit which obtains a difference image between the current floor image and a background image selected from among the plurality of floor images of the feature map, detects a dusty area based on the difference image, and adjusts the cleaning power of the cleaning robot.

According to another aspect of the present invention, there is provided a computer-readable recording medium encoded with processing instructions for causing a processor to execute the aforesaid dust detection method.

According to another aspect of the present invention, there is provided a cleaning robot, including: an image acquisition unit acquires floor images of a predetermined place in which the cleaning robot moves while performing a cleaning process; an image processing unit which performs treatments on the acquired floor image; and a control unit which obtains a obtain difference images between the acquired floor images and a plurality of floor images of a feature map, detects an area with the use of the difference images, and adjusts the cleaning power of the cleaning robot.

According to another aspect of the present invention, there is provided a method of controlling a cleaning robot, including: loading a feature map; detecting a dusty area; adjusting the cleaning power of the cleaning robot to a calculated cleaning power; determining whether the dusty area is larger than one grid, which is a maximum cleaning area of the cleaning robot in any location; moving the cleaning robot to a grid nearest to a current location, when the dusty area is determined to be larger than one grid, modifying an existing cleaning path, performs a cleaning operation in the nearest grid, and upon completing the cleaning operation, returning to the current location; performing a cleaning operation by following an existing cleaning path when the dusty area is smaller than one grid, displaying grids which have already been cleaned and other grids which are yet to be cleaned by the cleaning robot; and judging whether the cleaning robot has completed its cleaning operation in all grids zones and, when the cleaning robot has not yet completed its cleaning operation in all grids repeating the detecting, adjusting, determining, moving, performing, and judging.

According to another aspect of the present invention, there is provided a computer readable storage medium encoded with processing instructions for causing a processor to execute the aforesaid method of controlling a cleaning robot.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1:
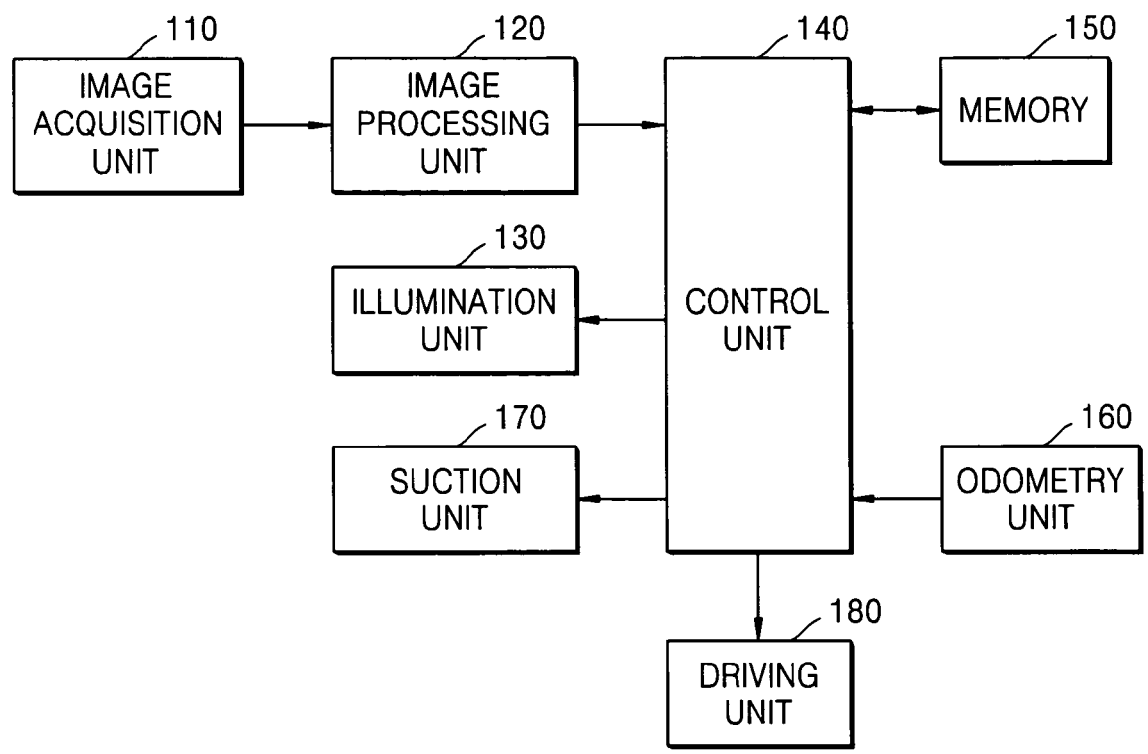
FIG. 1 is a block diagram of a cleaning robot according to an exemplary embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram of cleaning robot according to an exemplary embodiment of the present invention. Referring to FIG. 1, the cleaning robot includes an image acquisition unit 110, an image processing unit 120, an illumination unit 130, a control unit 140, a memory 150, an odometry unit 160, a suction unit 170, and a driving unit 180.

The image acquisition unit 110 is installed on a lower portion of the cleaning robot and acquires floor images of a predetermined place, in which the cleaning robot moves around while performing a cleaning process. The image acquisition unit 110 may be a camera with a wide angle or super-wide angle lens (e.g., a fisheye lens).

The image processing unit 120 performs various treatments, such as distortion compensation and pre-treatment processes, on the floor image acquired by the image acquisition unit 110.

The illumination unit 130 is installed on the lower portion of the cleaning robot, and is turned on and off by the control unit 140 whenever the image acquisition unit 110 acquires floor images.

The control unit 140 controls some of the elements of the cleaning robot by running a predetermined control program. The control unit 140 may control the illumination unit 120 and the image acquisition unit 110 so that the image acquisition unit 110 can acquire floor images, obtain difference images between the acquired floor images and a plurality of floor images of a feature map stored in the memory 150, detect an area with the use of the difference images, and adjust the cleaning power of the cleaning robot based on the size of the area that requires cleaning.

The memory 150 stores a plurality of floor images of the predetermined place and the respective locations of the cleaning robot in the predetermined place as the feature map.

The odometry unit 160 determines the distance that the cleaning robot has moved. An encoder may be used as the odometry unit 160.

The suction unit 170, which is installed on the lower surface of the cleaning robot to come into direct contact with the floor of the predetermined place, collects dust and dirt from the floor of the predetermined place by an air suction.

The driving unit 180 drives driving motors (not shown) which are independent of each other and under the control of the control unit 140 such that one of the driving motors rotates in a forward direction and the second driving motor rotates in a backward direction.

Figure 2:
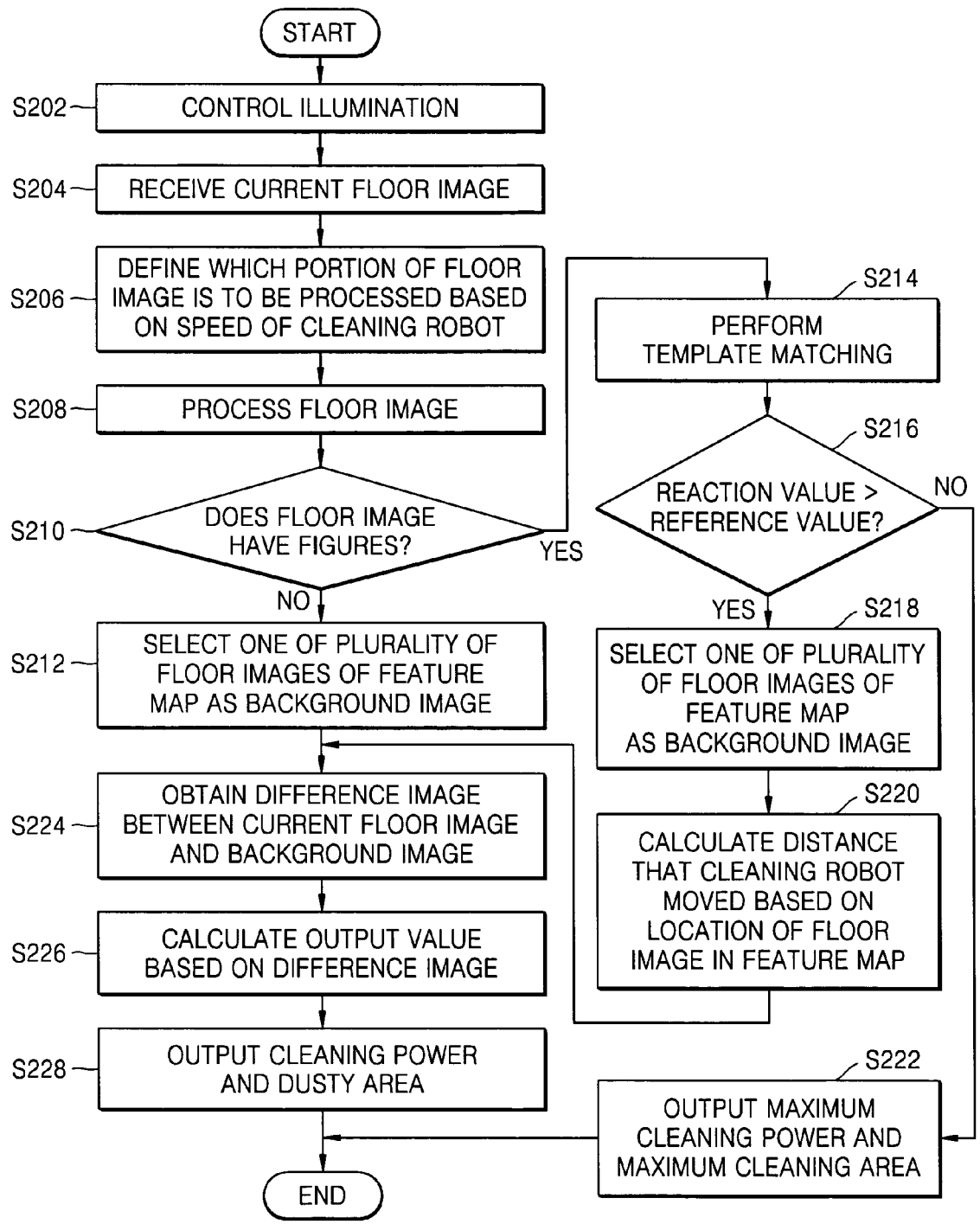
FIG. 2 is a flowchart of a dust detection method according to an embodiment of the present invention.

FIG. 2 is a flowchart of a dust detection method according to the present embodiment of the present invention. Referring concurrently to FIGS. 1 and 2, the illumination control is performed in operation S202. The illumination unit 130 is turned on slightly before the image acquisition unit 110 acquires a floor image and is turned off slightly after the image acquisition unit 110 acquires the floor image. A current floor image acquired by the image acquisition unit 110 is input in operation S204. The input rate of frames by the image acquisition unit 110 may be several per second. Thereafter, in operation S206, which portion (hereinafter, referred to as an image processing portion) of the current floor image is to be processed by the image processing unit 120 is determined based on the speed of the cleaning robot. Floor images consecutively acquired by the image acquisition unit 110 when the cleaning robot moves at low speeds are likely to represent almost the same portions of the floor, in which case, there is no need for the image processing unit 120 to repeatedly process redundant portions of the floor images. For example, it is assumed that the cleaning robot moves at 300 mm/sec, and the image acquisition unit 110 takes a 30 cm×20 cm floor image every 33 ms. Since the cleaning robot moves about 1 cm (=300×0.033) every 33 ms, a portion of the current floor image ranging from the top of the current floor image to 3 cm below therefrom may be determined as the image processing portion.

The image processing portion includes three sub-portions, i.e., upper and lower sub-portions which are each 1 cm wide, and a middle sub-portion which is interpolated between the upper and lower portions and also 1 cm wide. The middle sub-portion reflects the distance ($\Omega$ 1 cm) the cleaning robot moved in 33 ms, and the upper and lower sub-portions are provided to compensate for a difference between 1 cm and the distance that the cleaning robot moved in 33 ms.

In operation S208, the image processing unit 120 performs a distortion compensation treatment and pre-treatment on the portion of the current floor image to be processed.

Figure 5A:
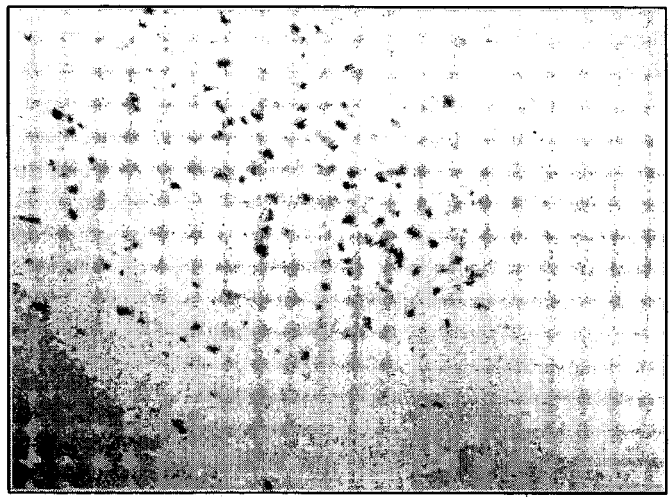
FIGS. 5A, 5B, and 5C illustrate patternless (solid) floor images, i.e., a current floor image, a stored floor image, and a difference image between the current floor image and the stored floor image, respectively.
Figure 5B:
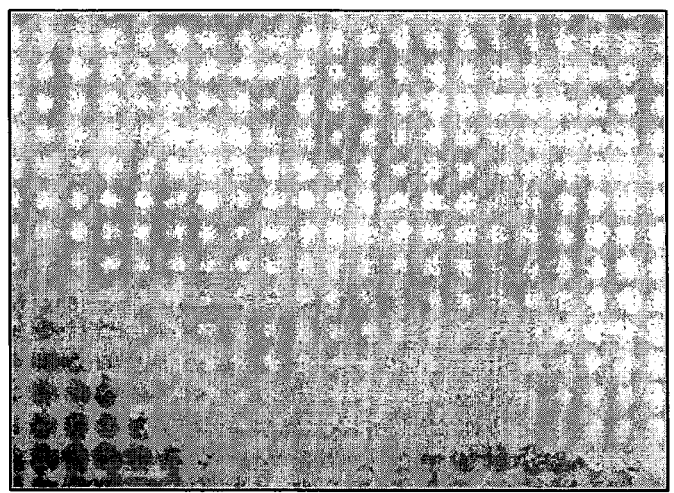

In operation S210, it is determined based on a feature map whether the current floor image has figures. The feature map is a map of a plurality of floor images obtained at various locations on the floor. A method of forming the feature map will be described later with reference to FIG. 3. If the current floor image is determined not to have patterns, one of the plurality of floor images of the feature map is selected as a background image for the current floor image in operation S212, and then the dust detection method proceeds to operation S224. Here, the background image is an image selected from among the plurality of floor images of the feature map, and then it is compared with the current floor image. FIG. 5A illustrates a current floor image not having figures, and FIG. 5B illustrates a stored floor image corresponding to the current floor image.

Figure 6A:
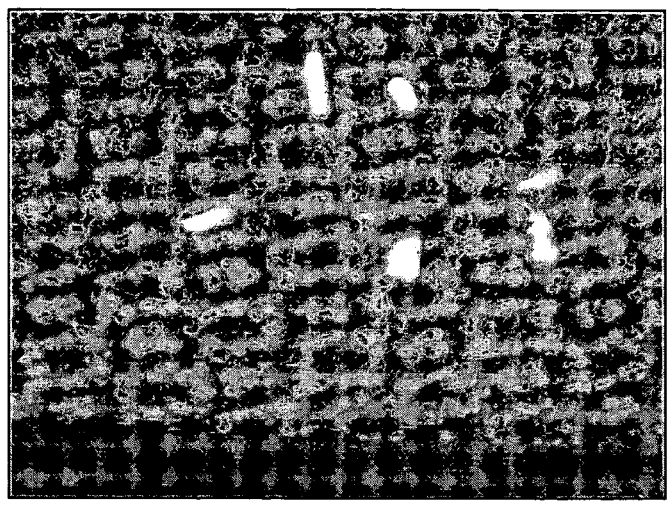
FIGS. 6A, 6B, 6C, and 6D are patterned floor images, i.e., a current floor image, a stored floor image, a floor image obtained through normalized correlation, and a difference image, and a difference image between the current floor image and the stored floor image, respectively.
Figure 6B:
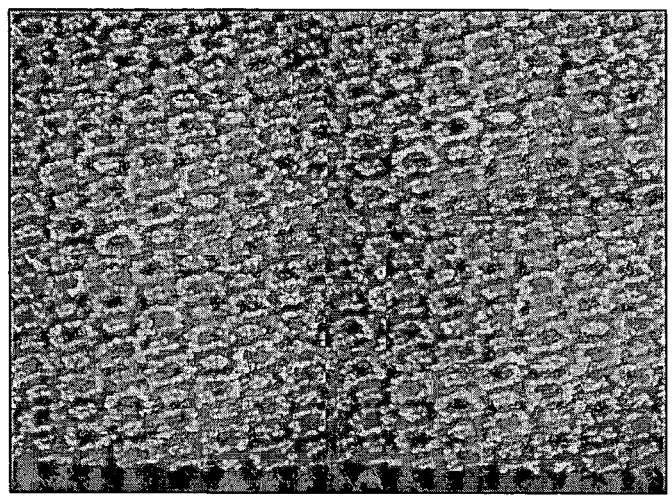

If the current floor image is determined to have figures based on the feature map, a template matching process is performed in operation S214. FIG. 6A illustrates a current floor image having figures, and FIG. 6B illustrates a stored floor image corresponding to the current floor image.

A similarity γ(s, t) is obtained by template matching a template image with the current floor image. Template matching based on a normalized correlation is described by Rafael C. Gonzales and Richard E. Woods in "Digital Image Processing" (pp. 583-586,1992). The similarity γ(s, t) is defined by Equation (1) below:

$$r(s,t) = \frac{\sum_x \sum_y [f(x,y)\overline{f}(x,y)][w(x\ s),(y\ t)\overline{w}]}{\left\{\sum_x \sum_y [f(x,y)\overline{f}(x,y)]^2 \sum_x \sum_y [w(x\ s,y\ t)\overline{w}]^2\right\}^{\frac{1}{2}}} \quad (1)$$

where w(x, y) denotes the template image, $\overline{w}$ denotes an average of the values of pixels of the template image w(x, y), f(x, y) denotes the current floor image, and $\overline{f}$(x, y) denotes an average of the values of pixels in a predetermined portion of the current floor image f(x, y) corresponding to the template image w(x, y) (i.e., on the feature map).

Figure 6C:
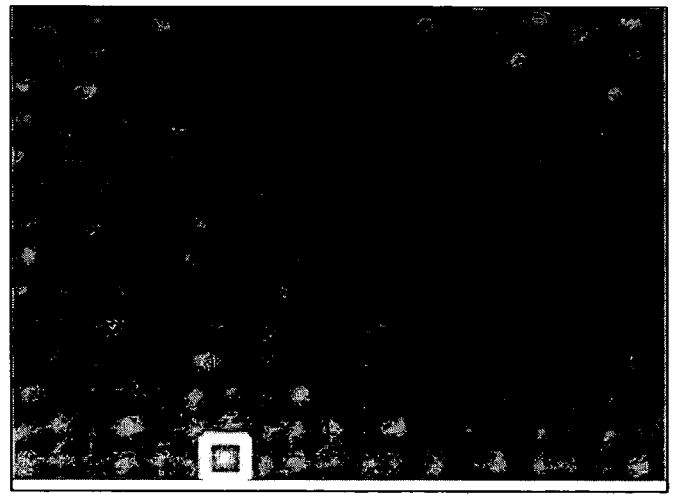

In operation S216, the similarity obtained as a result of the template matching process is compared with a predetermined reference value. If the similarity is larger than the predetermined reference value, one of the plurality of images of the feature map is selected as a background image in operation S218. FIG. 6C illustrates an image whose similarity, obtained as a result of normalized correlation-based template matching, is larger than the predetermined reference value. In operation S220, the distance that the cleaning robot has moved is determined based on the location of the current floor image in the feature map. Accordingly, an error in the distance that the cleaning robot has moved, calculated by the odometry unit 160, can be compensated for based on the distance that the cleaning robot has moved, calculated in operation S220. Thereafter, the dust detection method proceeds to operation S224.

If the similarity is not larger than the predetermined reference value, it is determined that there is a large amount of dust and dirt on a portion of the floor corresponding to the current floor image. Thus, the control unit 140 outputs a maximum cleaning power or a maximum cleaning area in operation S222. If the suction unit 170 is formed as a single device, the control unit 140 outputs the maximum cleaning power. If the suction unit is composed of a plurality of suction devices, the control unit 140 outputs the maximum cleaning area and the maximum cleaning power. Here, when the maximum cleaning area is output, a cleaning operation is performed using all of the suction devices. The similarity may be the same as or lower than the predetermined reference value due to obstacles on the floor of the predetermined place other than dust particles. This factor is taken into account when forming the feature map.

Figure 5C:
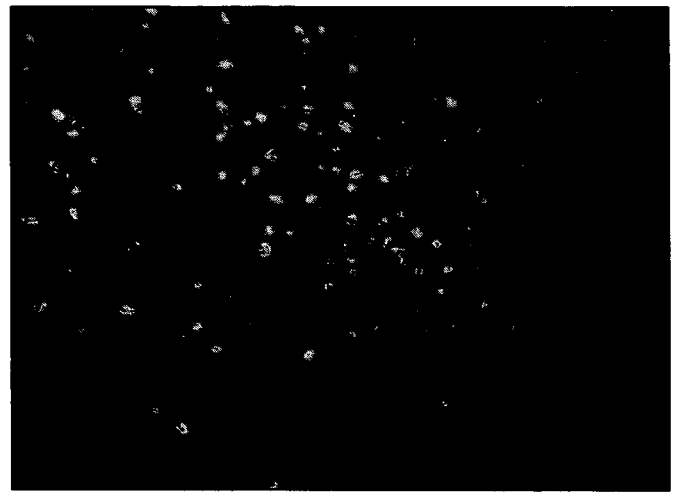
Figure 6D:
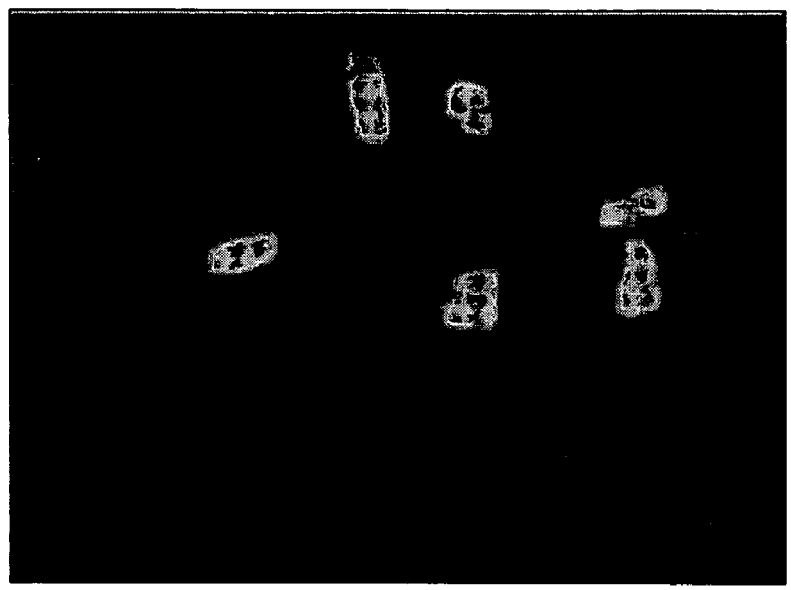

In operation S224, a difference image between the current floor image and the background image is obtained. FIG. 5C illustrates a difference image between the floor images of FIG. 5A and 5B, and FIG. 6D illustrates a difference image between the floor images of FIGS. 6A and 6B. The difference image between the current floor image and the background image is obtained by using Equation (2) below:

$$d(x, y)=|f(x, y)-w(x, y)| \quad (2)$$

where f(x, y) denotes the current floor image, w(x, y) denotes the background image, and d(x, y) denotes the difference image between the current floor image and the background image. Supposing that the current floor image perfectly matches with the background image, the difference image between the current floor image and the background image is obtained by subtracting a value of each pixel of the background image from a value of a corresponding pixel of the current floor image and then determining the absolute value of the subtraction results. Each pixel of the difference image may have an RGB value or a grey level.

In operation S226, cleaning power and a dusty area are determined based on the difference image. The dusty area is determined based on pixels of the difference image having an RGB value or grey level higher than a predetermined critical value, and the cleaning power is calculated based on the total area of the dusty area. Cleaning powers for different areas of dusty areas can be stored in memory as a table.

Thereafter, in operation S228, the control unit 140 outputs the cleaning power and the dusty area.

Figure 3:
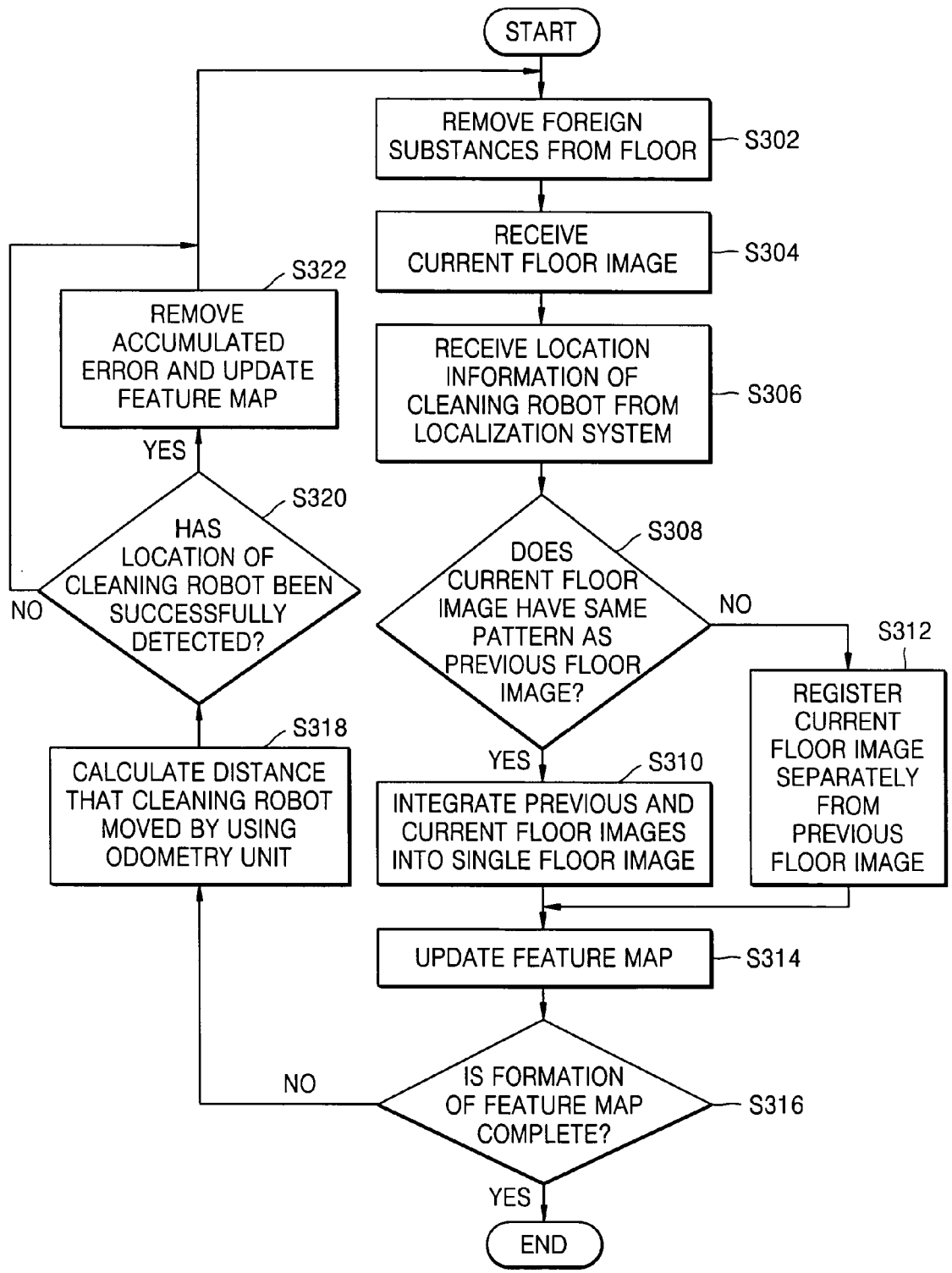
FIG. 3 is a flowchart of a method of forming a feature map usable with the method of FIG. 2.

FIG. 3 is a flowchart of a method of forming a feature map according to the present embodiment of the present invention. Referring to FIG. 3, the cleaning robot removes dust and dirt on the floor while cleaning the predetermined place in operation S302. In operation S304, a current floor image is input to the cleaning robot by the image acquisition unit 110. In operation S306, current location information of the cleaning robot is received from a localization system (not shown). The localization system is a system which takes an image of the ceiling of the predetermined place, in which the cleaning robot moves, detects an artificial mark from the ceiling image, and estimates the location and azimuth angle of the cleaning robot based on the location of the artificial mark or data provided by the odometry unit 160. Thereafter, in operation S308, it is determined whether the current floor image has the same pattern as a previous floor image stored in a feature map, i.e., whether the current floor image is identical with the previous floor image. If the current floor image has the same pattern as the previous floor image, the current floor image is integrated into the previous floor image in the feature map in operation S310. In other words, the fact that the current floor image has the same pattern as the previous floor image is recorded in the feature map as background image data without storing the current floor image in the memory 150, thus reducing the storage used in the memory 150, which stores the feature map. Thereafter, the method proceeds to operation S314.

If the current floor image does not have the same pattern as the previous floor image in the feature map, the current floor image and the current location data of the cleaning robot are registered with the feature map separately from the previous floor image in operation S312.

In operation S314, the feature map is updated by storing the current location information of the cleaning robot, which is obtained in operation S306, the previous floor image, into which the current floor image is integrated in operation S310, and the current floor image, which is registered with the feature map separately from the previous floor image in operation S312, in the memory 150. In operation S316, it is determined whether the formation of the feature map is complete.

If the formation of the feature map is incomplete, the current location of the cleaning robot is detected again or estimated by the localization system in operations S318 through S322. More specifically, when the cleaning robot moves, the distance that the cleaning robot moved is measured by the odometry unit 160 in operation S318. In operation S320, it is determined whether a current location of the cleaning robot has been successfully detected. The new current location of the cleaning robot is detected by using the artificial mark attached onto the ceiling of the predetermined place as a reference.

If the artificial mark is detected at the current location of the cleaning robot, an accumulated error between the distance that the cleaning robot moved, measured by the odometry unit 160, and the distance that the cleaning robot moved, calculated based on the new current location of the cleaning robot is removed, and then the current location data of the cleaning robot stored in the feature map is updated by using the new current location of the cleaning robot in operation S322. If the feature map is updated in operation S322 or if the new current location of the cleaning robot is yet to be detected in operation S320, the method returns to operation S302.

If the formation of the feature map is complete in operation S316, the method ends.

Figure 4:
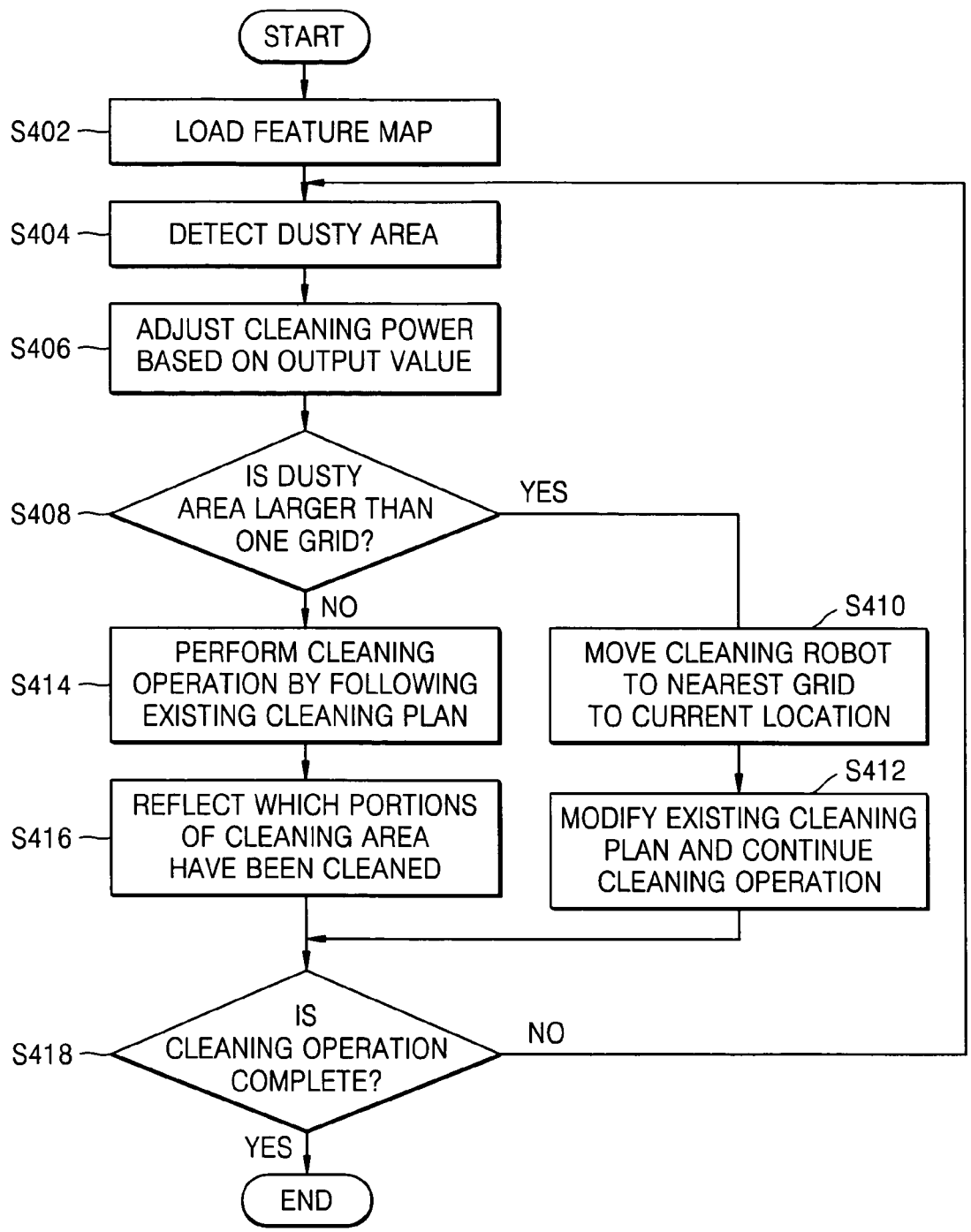
FIG. 4 is a flowchart of a method of controlling a cleaning robot according to an embodiment of the present invention.

FIG. 4 is a flowchart of a method of controlling a cleaning robot, which performs the dust detection method of FIG. 2, according to an embodiment of the present invention. Referring to FIG. 4, a feature map, which is generated by using the method of forming a feature map of FIG. 3 and then stored in the memory 150, is loaded in the control unit 140 in operation S402. Thereafter, as shown in FIG. 2, a dusty area is detected in operation S404. In operation S406, the control unit 140 adjusts the cleaning power of the cleaning robot to a calculated cleaning power.

In operation S408, it is determined whether the dusty area is larger than one grid, which is a maximum cleaning area of the cleaning robot in any location. If the dusty area is larger than one grid, the control unit 140 adjusts the driving unit 180 to move the cleaning robot from a current grid zone where the cleaning robot is currently located in another grid zone, which, like the current grid zone, overlaps the dusty area and is nearest to the current grid zone, in operation S410. In operation S412, an existing cleaning path is modified, and the cleaning robot performs a cleaning operation in the nearest grid zone to the current grid zone. Once the cleaning robot completes the cleaning operation in the nearest grid zone to the current grid zone, it returns to its original location, i.e., the current grid zone, and then the method proceeds to operation S416.

If the dusty area is smaller than one grid, the cleaning robot performs a cleaning operation by following the existing cleaning path in operation S414. Thereafter, in operation S416, grid zones, which have already been cleaned by the cleaning robot, and other grid zones, which are yet to be cleaned by the cleaning robot, are displayed on a display unit (not shown) installed at a main body of the cleaning robot. The display unit may be a liquid crystal display (LCD).

Thereafter, in operation S418, it is determined whether the cleaning robot has completed its cleaning operation in all grid zones. If the cleaning robot has not yet completed its cleaning operation in all grid zones, the method returns to operation S404, and then the cleaning robot continues to perform its cleaning operation. Otherwise, the method ends.

Embodiments of the present invention can be realized as computer-readable codes written on a computer-readable recording medium. The computer-readable recording medium includes nearly all kinds of recording devices, on/from which data can be written/read by computer systems. For example, the computer-readable recording medium includes a ROM, a RAM, a CD-ROM, a magnetic tape, a floppy disk, an optical data storage, and a carrier wave (e.g., data transmission through the Internet). The computer-readable recording medium can be distributed over a plurality of computer systems connected to one another via a network so that computer codes therein can be executed in a decentralized manner. Functional programs, codes, and code segments that embody the present invention can be easily derived by those skilled in the art.

According to the described embodiments of the present invention, it is possible to enhance the performance of the cleaning robot by obtaining a difference image between an input image obtained at a current location of the cleaning robot and a predetermined background image selected from among a plurality of images of a feature map, detecting whether there is dust and dirt on the floor of a predetermined place that requires cleaning by the cleaning robot, and enabling the cleaning robot to perform a cleaning operation based on the detection results. In addition, it is possible to compensate for an error between the distance that the cleaning robot moved, calculated by an odometry unit of the cleaning robot, and the distance that the cleaning robot moved, calculated based on the location of the predetermined background image in the feature map.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A dust detection apparatus of a cleaning robot, comprising:
   an image acquisition unit which acquires a floor image as a current floor image at a current location of the cleaning robot in the predetermined place; and
   a control unit which calculates a difference image between the current floor image and a background image selected from among the plurality of floor images of a feature map, detects a dusty area based on the calculated difference image, and adjusts the cleaning power of the cleaning robot based on the detected dusty area,
   wherein, when the plurality of floor images of the feature map have no patterns, the control unit selects one of the plurality of floor images as the background image, and when the plurality of floor images of the feature map have patterns, the control unit performs template matching on the current floor image and each of the plurality of floor images of the feature map, measures a similarity between the current floor image and each of the floor images, comparing a maximum among similarities obtained as template matching results with a predetermined reference value, and selects one of the plurality of floor images of the feature map corresponding to the maximum similarity as the background image when the maximum similarity is larger than the predetermined reference value and sets the cleaning power of the cleaning robot to a maximum level when the maximum similarity is not larger than the predetermined reference value.

2. The dust detection apparatus of claim 1, wherein the feature map is generated by causing the cleaning robot to remove dust and dirt on the floor of the predetermined place, acquire floor images of the predetermined place, and store, as a map, the acquired floor images and the respective locations of the cleaning robot provided by a localization system.

3. The dust detection apparatus of claim 1, wherein, when the current floor image is identical to a previous floor image already stored in the feature map, the identity of the current floor image with the previous floor image is displayed on the feature map, otherwise, the current floor image is stored in the feature map separately from the previous floor image.

4. The dust detection apparatus of claim 1, wherein, when one of the plurality of floor images of the feature map is selected as the background image, the control unit calculates a distance that the cleaning robot moved based on the location of the background image in the feature map and compensates for an error in the calculated distance that the cleaning robot has moved.

5. The dust detection apparatus of claim 1, further comprising an illumination unit which is turned on when the image acquisition unit acquires the current floor image.

6. The dust detection apparatus of claim 1, further comprising a memory which stores the feature map.

7. A cleaning robot, comprising:
an image acquisition unit which acquires floor images in which the cleaning robot moves while performing a cleaning process;
an image processing unit which performs treatments on the acquired floor images; and
a control unit which calculates difference images between each of the acquired floor images and a plurality of floor images of a feature map, detects a dusty area based on pixels of the calculated difference images having a value greater than a predetermined value, and adjusts the cleaning power of the cleaning robot based on whether the pixel values are greater than the predetermined value,
wherein the control unit adjusts the cleaning power based on the size of the area that requires cleaning.

8. The cleaning robot of claim 7, wherein the image acquisition unit may be a camera with a wide angle or super-wide angle lens (e.g., a fisheye lens).

9. The cleaning robot of claim 8, wherein the treatments include distortion compensation and pre-treatment processes.

10. The cleaning robot of claim 7, further comprises an illumination unit which is turned on by the control unit when the image acquisition unit acquires floor images.

11. The cleaning robot of claim 7, further comprises a memory which stores the plurality of floor images of the predetermined place and the respective locations of the cleaning robot in the predetermined place as the feature map.

12. The cleaning robot of claim 7, further comprising an odometry unit which determines a distance that the cleaning robot has moved.

13. The cleaning robot of claim 12, wherein the odometry unit is an encoder.

* * * * *